(12) United States Patent
Wessner

(10) Patent No.: US 6,995,335 B2
(45) Date of Patent: Feb. 7, 2006

(54) METHOD OF THERMAL PROCESSING OF A METAL WORKPIECE

(75) Inventor: Michael Wessner, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 83 days.

(21) Appl. No.: 10/792,906

(22) Filed: Mar. 5, 2004

(65) Prior Publication Data

US 2004/0226924 A1 Nov. 18, 2004

(30) Foreign Application Priority Data

Mar. 5, 2003 (EP) .............................................. 03004785

(51) Int. Cl.
*B23K 26/00* (2006.01)
*B23K 26/20* (2006.01)
*B23K 26/38* (2006.01)

(52) U.S. Cl. ............................. 219/121.64; 219/121.66; 219/121.69; 219/121.72

(58) Field of Classification Search ............... 219/121.6, 219/121.63, 121.64, 121.65, 121.66–121.69, 219/121.72, 121.85
See application file for complete search history.

(56) References Cited

U.S. PATENT DOCUMENTS

| | | | | |
|---|---|---|---|---|
| 6,005,376 A | * | 12/1999 | Mett et al. ................... | 323/281 |
| 6,025,570 A | | 2/2000 | Fortain et al. | |
| 6,388,227 B1 | | 5/2002 | Dykhno et al. | |
| 2002/0008094 A1 | * | 1/2002 | Briand et al. ........... | 219/137 R |

FOREIGN PATENT DOCUMENTS

DE          43 28 515          9/1994

* cited by examiner

*Primary Examiner*—Samuel M. Heinrich
(74) *Attorney, Agent, or Firm*—Fish & Richardson P.C.

(57) ABSTRACT

A method of thermal processing a metal workpiece that includes a surface oxide layer includes abrading a portion of the surface oxide layer by generating a plasma at the oxide surface layer of the metal workpiece, and melting a portion the workpiece by shining a laser beam at the abraded portion of the metal workpiece.

11 Claims, 1 Drawing Sheet

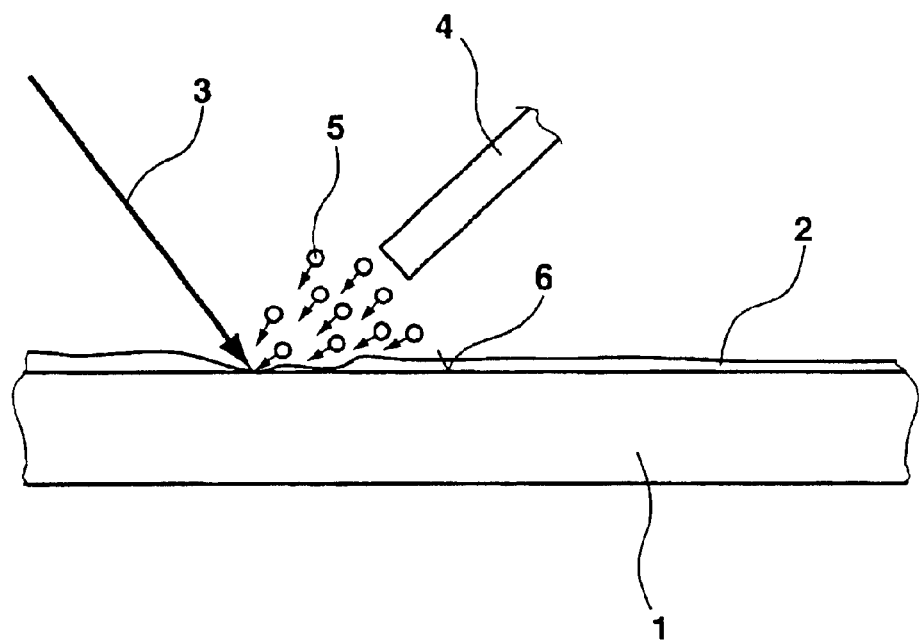

METHOD OF THERMAL PROCESSING OF A METAL WORKPIECE

CLAIM OF PRIORITY

This application claims priority under 35 USC §120 to European Patent Application Ser. No. 03004785, filed on Mar. 5, 2003, the entire contents of which are hereby incorporated by reference.

TECHNICAL FIELD

This disclosure relates to a method of thermal processing of a workpiece and, in particular, laser processing of an aluminum workpiece.

BACKGROUND

Currently, aluminum is welded mainly through arc welding methods, such as, for example, metal inert gas ("MIG") welding or wolfram inert gas ("WIG") welding, and, to an increasing extent, also through laser processing.

During laser welding of aluminum, generally high laser power has been required (e.g., for a $CO_2$ laser, a laser power of more than 4 KW must be used) because the aluminum has a high reflectivity and a low absorption compared to steel. Also, an oxide layer (e.g., $Al_2O_3$) that is generally present on the surface of an aluminum workpiece has a considerably higher melting point than pure aluminum, which results in a barrier for the introduction of thermal energy into the basic workpiece body of pure aluminum. Furthermore, because aluminum is a good thermal conductor, thermal energy introduced by the laser beam is quickly dissipated from the site where the laser beam strikes the workpiece, such that additional energy is required to maintain a melting bath in a liquid state.

SUMMARY

In a first general aspect, a method of thermal processing a metal workpiece that includes a surface oxide layer includes abrading a portion of the surface oxide layer by generating a plasma at the oxide surface layer of the metal workpiece, and melting a portion the workpiece by shining a laser beam at the abraded portion of the metal workpiece.

In another general aspect, a metal work piece is produced by a the method of thermal processing.

One or more of the following features may be included. For example, the plasma can be generated by passing an alternating current between an electrode and the metal workpiece through an inert gas. The electrode can include tungsten or titanium. The metal workpiece can include aluminum, and the oxide surface layer can include $Al_2O_3$. The laser beam can be shined through the plasma. The method can further include welding the melted portion of the workpiece to another workpiece. The method can further include cutting the workpiece through the melted portion of the workpiece.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a schematic side view of a metal workpiece with surface being treated with a plasma and with a laser beam.

DETAILED DESCRIPTION

As shown in FIG. 1, an aluminum sheet workpiece, before it is processed, includes a basic workpiece body 1 of aluminum and an oxide layer 2 of $Al_2O_3$ that covers the basic workpiece body 1. Aluminum has a melting point of 660° C., while the oxide layer of $Al_2O_3$ melts at 2500° C. Thus, the processing of the $Al_2O_3$ oxide layer 2 must be considered when considering the thermal processing of the workpiece.

Processing of the workpiece by a laser beam 3 for welding or cutting the basic workpiece body 1 can be preceded by pre-treatment of the aluminum oxide layer 2. During the pre-treatment, an alternating voltage is applied between the workpiece and a non-combustible tungsten electrode 4, while an inert process gas, such as, for example, argon, helium, or a mixture of the two gases, is added. The electrical energy of the electric field converts the neutral gas atoms into gas ions 5 and electrons (not shown in the drawing). Positive gas ions 5 are accelerated towards the cathode (e.g., the workpiece 1) and strike the oxide surface layer 2 of the workpiece 1, and electrons are accelerated towards the anode (tungsten electrode 4). The accelerated gas ions 5 also release further electrons on the oxide layer 2. Collisions between electrons and gas atoms produce further ionizations. The process continues like an avalanche until complete gas ionization is achieved and a plasma is obtained. Different collision processes thereby lead to the emission of light (arc light).

The kinetic energy of the gas ions 5 striking the oxide layer 2 rapidly destroys the oxide layer 2 through abrasion of the oxide layer 2 without considerably heating up the basic workpiece body 1. During the process, the workpiece surface 2 should be heated to a temperature no higher than the melting temperature of the workpiece 1 through plasma treatment to ensure that the plasma treatment is not used for thermal processing of the basic workpiece body 1. Thermal processing (e.g., welding or cutting) of the basic workpiece body 1 should be produced only by the laser beam 3.

The plasma can be generated in different ways. For example, the plasma can be generated by connecting a tungsten electrode or titanium electrode to a source of alternating current and passing the current from the electrode through a supply of an inert gas (e.g., argon, helium, or an argon-helium mixture) to the workpiece 1. Through suitable selection of the process parameters (low alternating voltage, controlled gas supply) and of the process arrangement (angle and separation of the tungsten electrode 4, intersection of the active region of plasma and the laser beam 3) the oxide layer 2 may be abraded without initially melting the basic workpiece body 1. For example, an alternating current with a frequency of 50–300 Hz, a voltage of about 10–30 V and a current of about 10–100 A can be used. An argon/helium gas flow of about 0.5–30 liters per minute can be used. The electrode 4 can be held at an angle of 0–60 to the normal to the surface to create the plasma.

The produced plasma is used for cleaning the workpiece surface 6 of the basic workpiece body 1 through abrasion of the oxide layer 2. Thus, the oxide layer 2 is largely "mechanically" processed through the kinetic energy of the incident gas ions 5. While the plasma acts on the workpiece body 1, the laser beam 3 is shined onto the body 1.

Because the plasma works to remove the oxide layer 2 through a pre-treatment "mechanical" or "sputtering" process, the plasma process contributes only indirectly to thermal processing of the basic workpiece body 1. The actual thermal processing of the basic workpiece body 1 is achieved through heating by the laser beam 3. After abrasion of the oxide layer, the coupling of the laser energy into the workpiece surface 6 of the basic workpiece body 1 is supported by the plasma treatment accompanying laser processing. The workpiece surface 6 is cleaned and kept clean in situ directly before laser processing as long as laser processing takes place at this location.

At the beginning of the actual welding process, the plasma stabilizes the laser welding process and can introduce additional heat into the workpiece 1 to keep the melting bath liquid in an improved fashion and for a longer time without increasing the laser power compared to a laser cutting or welding process that does not use a plasma. When the processing regions of the laser beam 3 and the plasma cross, energy or heat can be introduced to the workpiece 1 through the plasma into the molten region of the basic workpiece body 1 after abrasion of the oxide layer 2. The laser power required for maintaining the molten condition is reduced compared to a plasma-less process by about 1–2 kilowatts. The improved maintenance of the molten condition also has the positive effect that pore formation within the cut or welded workpiece 1 is reduced.

OTHER EMBODIMENTS

A number of embodiments of the invention have been described. Nevertheless, it will be understood that various modifications may be made. Accordingly, other embodiments are within the scope of the following claims.

What is claimed is:

1. A method of processing a metal workpiece that includes a surface oxide layer, the method comprising:

abrading a portion of the surface oxide layer by generating a plasma at the surface oxide layer of the metal workpiece without substantially melting the workpiece; and melting a portion of the workpiece by shining a laser beam at the abraded portion of the metal workpiece.

2. The method of claim 1, wherein the plasma is generated by passing an alternating current between an electrode and the metal workpiece through an inert gas.

3. The method of claim 2, wherein the electrode comprises tungsten.

4. The method of claim 2, wherein the electrode comprises titanium.

5. The method of claim 1, wherein the metal workpiece comprises aluminum and the surface oxide layer comprises $Al_2O_3$.

6. The method of claim 1, wherein the laser beam is shined through the plasma.

7. The method of claim 1, further comprising welding the melted portion of the workpiece to another workpiece.

8. The method of claim 1, further comprising cutting the workpiece through the melted portion of the workpiece.

9. The method of claim 1, further comprising controlling the generation of the plasma to such that the temperature of the workpiece does not rise above the melting point of the workpiece.

10. The method of claim 1, further comprising controlling the generation of the plasma to prevent substantial melting of the workpiece by the plasma.

11. The method of claim 1, further comprising cleaning the workpiece after abrading a portion of the surface oxide layer and before melting the portion the workpiece.

* * * * *